US012706294B2

(12) United States Patent
Ojha et al.

(10) Patent No.: US 12,706,294 B2
(45) Date of Patent: Aug. 11, 2026

(54) IN-SITU MEASUREMENT TECHNIQUE FOR NONDESTRUCTIVE DETERMINATION OF END-OF-MIXING TIME DURING SLURRY PREPARATION FOR BATTERY MANUFACTURING PROCESS

(71) Applicant: Ford Global Technologies, LLC, Dearborn, MI (US)

(72) Inventors: Avinesh Ojha, Southgate, MI (US); Maryamossadat Akram, Ann Arbor, MI (US); Wanjiao Liu, Ann Arbor, MI (US)

(73) Assignee: Ford Global Technologies, LLC, Dearborn, MI (US)

(*) Notice: Subject to any disclaimer, the term of this patent is extended or adjusted under 35 U.S.C. 154(b) by 285 days.

(21) Appl. No.: 18/407,118

(22) Filed: Jan. 8, 2024

(65) Prior Publication Data

US 2025/0226376 A1 Jul. 10, 2025

(51) Int. Cl.
*H01M 4/04* (2006.01)
*G01N 29/032* (2006.01)
*H01M 4/62* (2006.01)

(52) U.S. Cl.
CPC ............ *H01M 4/04* (2013.01); *G01N 29/032* (2013.01); *H01M 4/623* (2013.01); *G01N 2291/015* (2013.01); *G01N 2291/0228* (2013.01); *G01N 2291/02818* (2013.01); *G01N 2291/106* (2013.01)

(58) Field of Classification Search
USPC ........................................................ 73/19.03
See application file for complete search history.

(56) References Cited

U.S. PATENT DOCUMENTS

| | | | | |
|---|---|---|---|---|
| 8,846,248 | B2 | 9/2014 | Ryu et al. | |
| 9,970,853 | B2 | 5/2018 | Lal et al. | |
| 10,892,517 | B2 | 1/2021 | Harada et al. | |
| 11,145,861 | B2 | 10/2021 | Dasgupta et al. | |
| 2018/0323421 | A1* | 11/2018 | Shen | H01M 4/139 |
| 2025/0087655 | A1* | 3/2025 | Zhou | H01G 11/30 |

FOREIGN PATENT DOCUMENTS

| | | |
|---|---|---|
| CN | 104587877 | 5/2015 |

OTHER PUBLICATIONS

Bauer, et al., Rheological properties and stability of NMP based cathode slurries for lithium ion batteries, Ceramics International, 2014, pp. 4591-4598, vol. 40, Elsevier Ltd and Techna Group S.r.l.

(Continued)

*Primary Examiner* — Walter L Lindsay, Jr.
*Assistant Examiner* — Warren K Fenwick
(74) *Attorney, Agent, or Firm* — Burris Law, PLLC

(57) ABSTRACT

A method of producing an electrode slurry for use in battery manufacturing includes mixing a plurality of slurry components within an internal volume of a mixing container, transmitting ultrasonic signals across the internal volume of the mixing container, monitoring an attenuation of the ultrasonic signals over a period of time, determining when an end-of-mixing condition is met when the acoustic attenuation reaches a predetermined value, and stopping the mixing when the end-of-mixing condition is met.

20 Claims, 5 Drawing Sheets

(56) References Cited

OTHER PUBLICATIONS

Gunasekaran, et al, Milk Coagulation Cut-Time Determination Using Ultrasonics, Journal of Food Process Engineering, 1996, pp. 63-73, vol. 19, Food & Nutrition Press, Inc., Connecticut.
Ono, A Comprehensive Report on Ultrasonic Attenuation of Engineering Materials, Including Metals, Ceramics, Polymers, Fiber-Reinforced Composites, Wood, and Rocks, Applied Sciences, 2020, 52 pgs., vol. 10, MDPI.
Kuc, Clinical Application of an Ultrasound Attenuation Coefficient Estimation Technique for Liver Pathology Characterization, IEEE Transactions on Biomedical Engineering, Jun. 1980, pp. 312-318, vol. BME-27, No. 6.
Sidebottom, Ultrasonic measurements of an epoxy resin near its sol-gel transition, Physical Review E, Jul. 1993, pp. 391-399, vol. 48(1), The American Physical Society.
Corredig, et al., The application of ultrasonic spectroscopy to the study of the gelation of milk components, Food Research International, 2004, pp. 557-565, vol. 37, Elsevier Ltd.
Smyth, et al., High-Frequency shear and vol. viscoelastic moduli of casein particle gel, Colloids and Surfaces A: Physicochemical and Engineering Aspects 183-185, 2001, pp. 517-526, Elsevier Science B.V.

* cited by examiner

IN-SITU MEASUREMENT TECHNIQUE FOR NONDESTRUCTIVE DETERMINATION OF END-OF-MIXING TIME DURING SLURRY PREPARATION FOR BATTERY MANUFACTURING PROCESS

FIELD

The present disclosure relates to battery manufacturing and more specifically to a method of mixing an electrode slurry.

BACKGROUND

The statements in this section merely provide background information related to the present disclosure and may not constitute prior art.

A typical process for battery electrode manufacturing consists of mixing an electrode material, coating the electrode material onto a surface of a current collector, drying the electrode material, and calendaring (compressing) the dried electrode. Each step of the electrode manufacturing process influences the subsequent manufacturing steps and the overall performance of the battery.

During the mixing step, binder materials, solvent, and electrode particles are added together to form a viscous liquid slurry in a mixing process. As the first step of the manufacturing process, mixing plays an important role in establishing the microstructure of the electrode slurry and the resulting battery. A good mixing process can lead to better electrochemical performance in the battery. However, it can be challenging to determine when the desired properties are reached while the mixing is in progress. Typical experimental methods do not easily scale to mass production.

These issues related to the manufacture of battery electrodes, and more specifically proper mixing of electrode slurries, are addressed by the present disclosure.

SUMMARY

This section provides a general summary of the disclosure and is not a comprehensive disclosure of its full scope or all of its features.

In one form, the present disclosure provides a method of producing an electrode slurry for use in battery manufacturing. The method includes mixing a plurality of slurry components within an internal volume of a mixing container; transmitting acoustic signals across the internal volume of the mixing container; monitoring an acoustic attenuation of the acoustic signals over a period of time; determining when an end-of-mixing condition is met when the acoustic attenuation reaches a predetermined value; and stopping the mixing when the end-of-mixing condition is met.

In variations of this method, which may be implemented individually or in any combination: the predetermined value is a target value of the acoustic attenuation; the predetermined value is a rate of change of the acoustic attenuation; the plurality of slurry components comprise carbon and a polyvinylidene fluoride (PVDF) binder; the acoustic signals are transmitted by a plurality of transducers located at a plurality of heights on the mixing container; and a plurality of acoustic signals are transmitted by an array of transducers.

The present disclosure further provides another method of producing an electrode slurry for use in battery manufacturing. The method includes mixing a plurality of slurry components within an internal volume of a mixing container; transmitting ultrasonic signals across the internal volume of the mixing container; monitoring an attenuation of the ultrasonic signals over a period of time; determining when an end-of-mixing condition is met when the acoustic attenuation reaches a predetermined value; and stopping the mixing when the end-of-mixing condition is met.

In variations of this method, which may be implemented individually or in any combination: the predetermined value is a target value of the attenuation of the ultrasonic signals; the predetermined value is a rate of change of the attenuation of the ultrasonic signals; and the ultrasonic signals are transmitted and received by an array of ultrasonic transducers.

In another form, the present disclosure provides yet another method of producing an electrode slurry for use in battery manufacturing. The method includes mixing a plurality of slurry components within an internal volume of a mixing container; transmitting acoustic signals across the internal volume of the mixing container; monitoring an attenuation of the acoustic signals over a period of time; and adjusting at least one mixing parameter based on the attenuation of the acoustic signals.

In variations of this method, which may be implemented individually or in any combination: the acoustic signals are transmitted and received by a plurality of acoustic transducers; the acoustic transducers are located on the outside of the mixing container; the acoustic transducers are located on the inside of the mixing container; the acoustic transducers are located at a plurality of heights on the mixing container; the acoustic signals are transmitted and received by an array of acoustic transducers; the mixing parameter is adjusted based on a rate of change of the attenuation of at least one of the plurality of acoustic signals; the mixing parameter is selected from the group consisting of a speed of mixing, starting, and stopping; the mixing parameter is selected from the group consisting of a location of a mixing blade within the internal volume and an angle of the mixing blade; and the mixing parameter is a mixing profile.

Further areas of applicability will become apparent from the description provided herein. It should be understood that the description and specific examples are intended for purposes of illustration only and are not intended to limit the scope of the present disclosure.

DRAWINGS

In order that the disclosure may be well understood, there will now be described various forms thereof, given by way of example, reference being made to the accompanying drawings, in which.

Figure 1A:
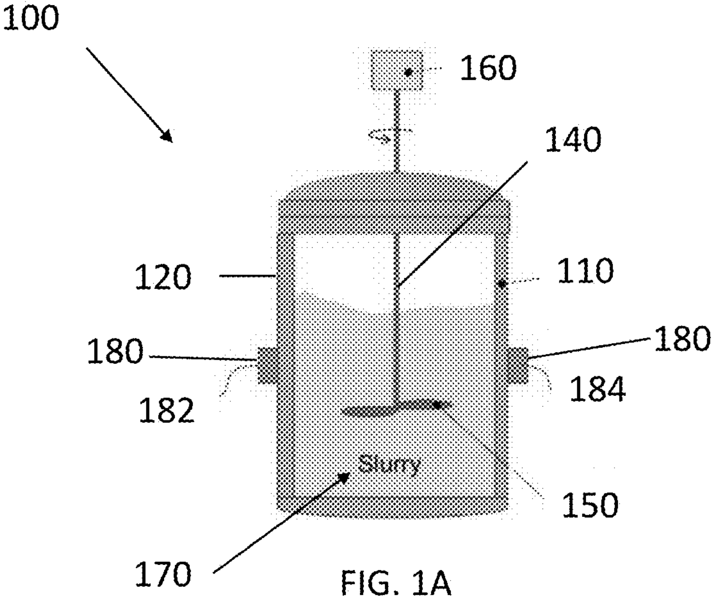
FIG. 1A is a schematic view of a mixing container for use in producing an electrode slurry according to the teachings of the present disclosure.

The drawings described herein are for illustration purposes only and are not intended to limit the scope of the present disclosure in any way.

DETAILED DESCRIPTION

The following description is merely exemplary in nature and is not intended to limit the present disclosure, application, or uses. It should be understood that throughout the drawings, corresponding reference numerals indicate like or corresponding parts and features.

An electrode slurry for use in batteries should be homogenous with a stable dispersion of components. With sufficient mixing, binders and particles within the slurry begin to coagulate into a network of weak bonds. Eventually, the slurry forms a gel system which has the required stability of particle dispersion. The gel system is characterized by particular rheological properties. In particular, a gel system exhibits "shear-thinning" characterized by decreasing viscosity with increasing shear rates. However, the proper formation of the gel system and the corresponding rheological properties are difficult to measure while mixing is in progress. The present disclosure provides a novel method of monitoring the electrode slurry during mixing to determine when the process is completed and when the desired rheological properties are achieved.

Figure 1B:
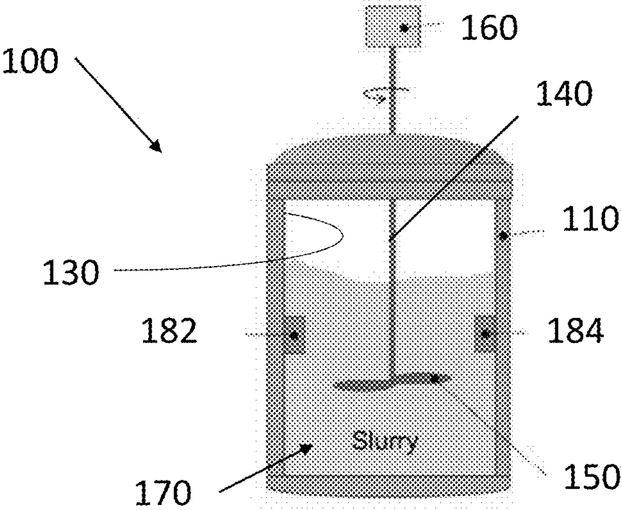
FIG. 1B is a schematic view of another mixing container for use in producing an electrode slurry according to the teachings of the present disclosure.
Figure 1C:
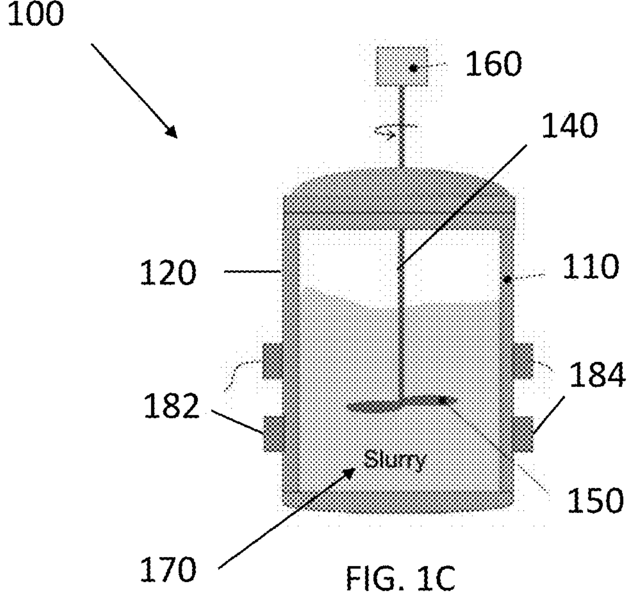
FIG. 1C is a schematic view of yet another mixing container for use in producing an electrode slurry according to the teachings of the present disclosure.

Referring to FIGS. 1A, 1B and 1C, a mixing container for use in producing an electrode slurry is shown and referred to by reference numeral 100. The mixing container 100 includes a container wall 110 with an outer surface 120 and an inner surface 130, a shaft 140, a plurality of mixing blades 150 secured to the shaft 140, and a motor 160 operatively connected to the shaft 155 to rotate the shaft 140 and the mixing blades 150. Further, the mixing container 100 defines an internal volume 170 as shown, in which the electrode slurry is mixed.

The mixing container 100 in this form also includes at least one set of transducers 180. Each set of transducers 180 comprises at least one emitter 182 and at least one receiver 184. In one form of the present disclosure, the transducers 180 are located on the outer surface 120 of the mixing container 100 as shown in FIG. 1A. In another form, the transducers 180 are located on the inner surface 130 of the mixing container 100 as shown in FIG. 1B. In yet another form, a plurality of transducers 180 are located at different locations on the inner 120 or the outer surface 130 of the mixing container 100 as shown in FIG. 1C. Further, the plurality of transducers 180 may be an array of transducers 180 comprising two or more emitters 182 corresponding to two or more receivers 184. Therefore, as used herein, the term "array" should be construed to mean two or more emitters 182 with a corresponding two or more receivers 184. For example, the array may include one or more rows of emitters 182 with a corresponding one or more rows of receivers 184. The emitters 182 and receivers 184 are thus in an organized arrangement when configured in an array. It should be understood, however, that any number and location of transducers 180 may be employed while remaining within the scope of the present disclosure.

In operation, the transducers 180 generate acoustic signals, which travel through the mixing container 100 and the electrode slurry in the internal volume 170 of the mixing container 100, between the emitters 182 and receivers 184. The acoustic signals attenuate as they travel through the electrode slurry. The level of attenuation is a function of the rheological properties of the electrode slurry. Therefore, monitoring the attenuation of the acoustic signals over time acts as a proxy for directly monitoring the change in rheological properties and the development of the gel system of the electrode slurry. In other words, the attenuation levels of the acoustic signals can be correlated to the rheological properties of the electrode slurry, which change over time the more the electrode slurry is mixed.

The acoustic signals are transmitted through the electrode slurry, and the speed of the sound and the attenuation of the sound is measured. The speed of the sound waves is related to the stiffness of the electrode slurry as $v=\sqrt{E/\rho}$, where v is the speed of the sound, E is the modulus (stiffness) and is $\rho$ the density of the electrode slurry. Thus, the sound waves are transmitted faster through an electrode slurry having a higher stiffness. The attenuation coefficient, $\alpha$, which denotes the loss in the intensity of the wave as it travels through the electrode slurry, is determined by comparing the amplitude of an initial sound wave to an attenuated, or transmitted, sound wave as $A=A_0 \exp(-\alpha x)$. Where $A_0$ is the initial wave amplitude and A is the transmitted wave amplitude over a distance x.

Figure 2:
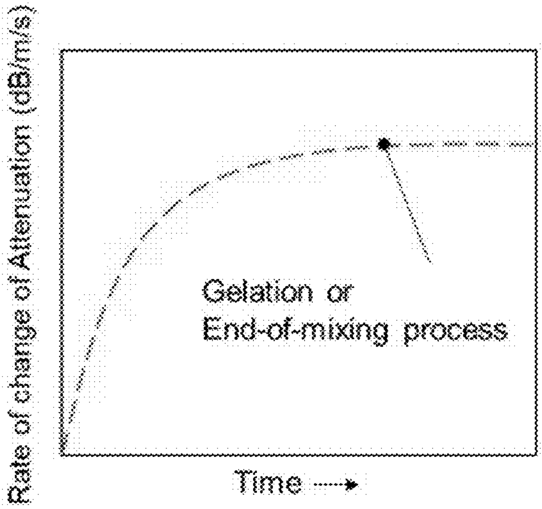
FIG. 2 is a chart illustrating the rate of change in attenuation coefficient of a mixture over time, according to the teachings of the present disclosure.

Referring now to FIG. 2, a typical rate of change of acoustic attenuation (dB/m/s) over time is shown. With continued mixing, the rate of change of acoustic attenuation decreases and eventually becomes relatively constant, thus indicating gelation or the end of the mixing process. The shape of the attenuation curve depends on the composition of the slurry. Thus, using this change of acoustic attenuation behavior, the present disclosure provides a system and method for determining an end-of-mixing condition, as well as adjusting at least one mixing parameter based on acoustic attenuation as set forth in greater detail below.

Figure 3:
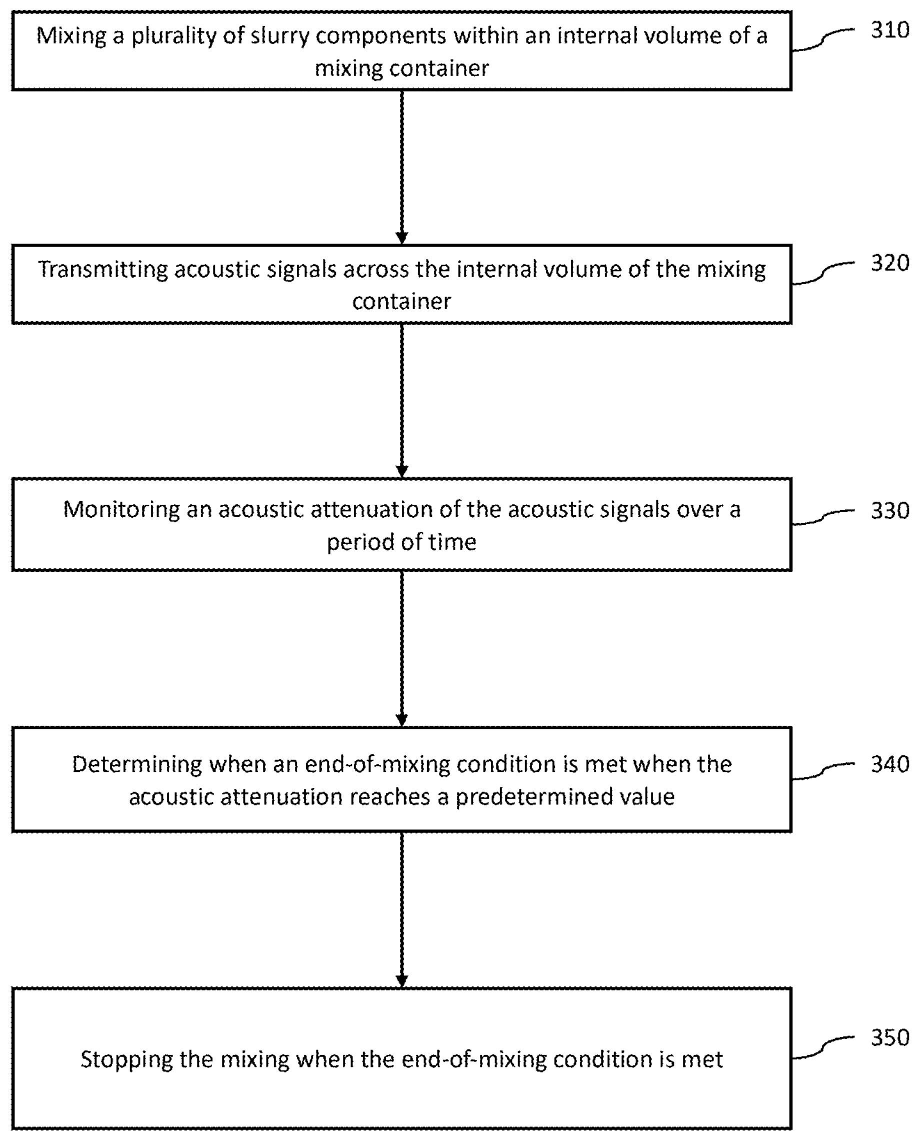
FIG. 3 is a flow diagram illustrating a method of producing an electrode slurry for use in battery manufacturing, according to the teachings of the present disclosure.
Figure 4:
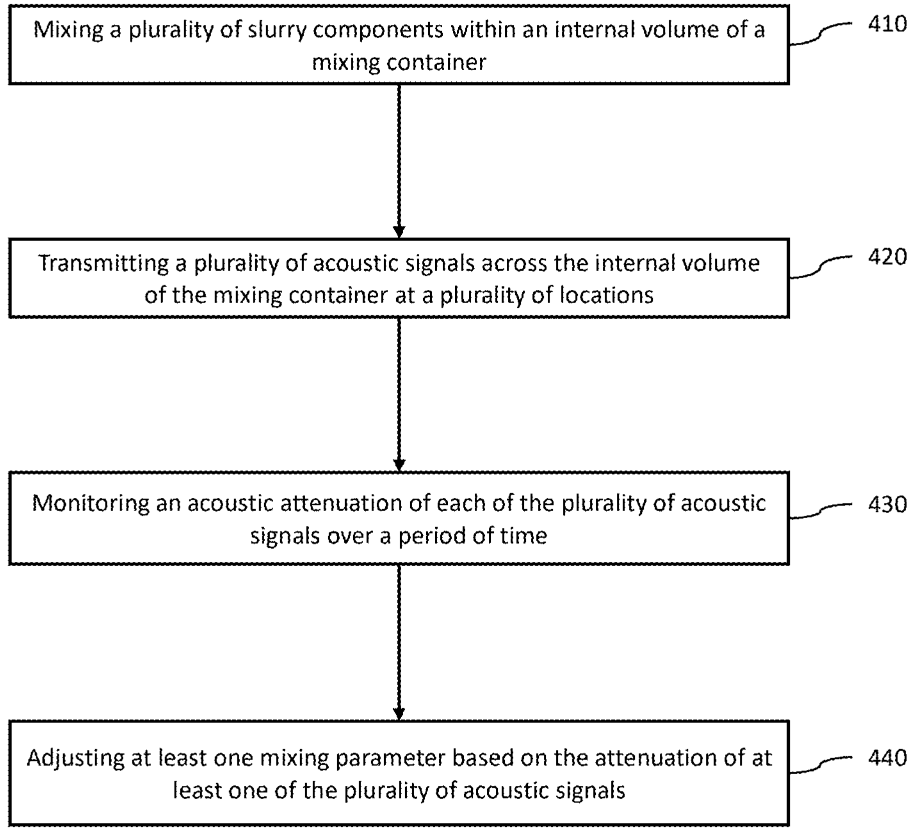
FIG. 4 is a flow diagram illustrating another method of producing an electrode slurry for use in battery manufacturing, according to the teachings of the present disclosure.

Referring now to FIGS. 3 and 4, variations of a process for producing an electrode slurry for use in battery manufacturing are shown. As shown in blocks 310 and 410, the method generally begins with mixing a plurality of slurry components within the internal volume 170 of the mixing container 100. The slurry components generally include electrode particles, a binder, and a solvent, but are not necessarily limited thereto.

The electrode particles include active particles and may optionally include electrically conductive additive particles. The active particles form the bulk of the electrode and interact with ions in the battery fluid, such as lithium ions in a lithium battery. In one form of the present disclosure, the active particles are a carbon material such as graphite. In other forms, the active particles are lithium titanate (Li4Ti5O12), lithium nickel manganese cobalt oxide (NMC111), lithium nickel manganese oxide (NMC532), and graphene, among others. The conductive additive particles aid the conductivity of the electrode and the movement of ions to the active particles. In one form, the conductive additive particles include carbon black. It should be understood that other materials for the electrode particles, which have the described properties and functions set forth herein, may be implemented while remaining within the scope of the present disclosure.

The binder may be any of a variety of polymeric materials that function to hold the electrode particles together. For example, the binder may be fluoro-acrylic polymer, polytetrafluoroethylene (PTFE), polyvinylidene fluoride, polyacrylates, aliphatic polymers, aromatic polymers, oligo- and poly-saccharides, chitosan, alginate, pectin, amylose, starch, gums, lignin, and proteins, among others. It should be understood that other materials which serve to bind the electrode particles may be utilized while remaining within the scope of the present disclosure.

The solvent generally functions to suspend or disperse the electrode particles and the binder particles and may be any of a variety of materials, including by way of example, H2O (Water), N-Methyl-2-pyrrolidone (NMP), Dimethylformamide (DMF), Dimethylacetamide (DMAC), and Dimethyl sulfoxide (DMSO), among others. It should be understood that other solvents may be implemented while remaining within the scope of the present disclosure.

In one exemplary form of the electrode material, the electrode is an anode, the binder particles are water soluble, and the solvent is water. In another form, the electrode is a cathode, the solvent is N-Methyl-2-pyrrolidone (NMP), the binder particles is PVDF, and the electrode particles include carbon black as a conductive additive particle. In this form, the binder and the carbon black create a porous network around the active material particles known as the carbon-binder domain. The main function of the carbon-binder domain is to aid electrical conduction from the current collector to the active material particles and maintain structural integrity and proper electrical contact of the electrode through adhesion with the current collector. The formation of the carbon-binder domain occurs during mixing as the carbon and binder particles gel together and can be monitored via the attenuation of the acoustic signals as described herein.

As the slurry components are mixing, acoustic signals are transmitted across the internal volume of the mixing container (blocks 320 and 420) by the transducers 180. In one form, the acoustic signals are ultrasonic signals. In other forms, the acoustic signals may be infrasonic or any other form of sonic wave, among others.

As the acoustic signals travel through the mixing slurry components, the acoustic signals attenuate, as shown in blocks 330 and 430. In one variation of the present disclosure, shown in block 340 of FIG. 3, the acoustic attenuation is used to determine when an end-of-mixing condition is met. The end of mixing condition is met when the acoustic attenuation reaches a predetermined value. When the end-of-mixing condition is met, the mixing process is stopped (block 350).

The predetermined value may be any value obtained by monitoring the acoustic attenuation, including, for example, a target value of the acoustic attenuation and a rate of change of the acoustic attenuation coefficient, among others. The predetermined value is selected based on the attenuation curve for a particular slurry composition. As one example, the predetermined value is selected to correlated to when the rate of change of attenuation has slowed to nearly 0. In other examples, the predetermined value is a change of 10%, 20%, or 50%.

Referring specifically to FIG. 4, in another variation of the present disclosure, as shown in block 440, at least one mixing parameter is adjusted based on the acoustic attenuation. The mixing parameters are any characteristics of the mixing process which can be adjusted to affect the developing rheological properties of the electrode slurry in the mixing container, as monitored by the attenuation. By way of example, the mixing parameters may include, but are not limited to, a speed of mixing, stopping the mixing process, starting the mixing process, a location of a mixing blades 150 within the internal volume 170, an angle of the mixing blades 150, and any combination of these or other parameters. In addition, in one form, adjusting the mixing parameter includes selecting a mixing profile. As used herein, the term "mixing profile" should be construed to mean predetermined mixing speeds over a time period or mixing blade locations at over a period of time, among others.

Unless otherwise expressly indicated herein, all numerical values indicating mechanical/thermal properties, compositional percentages, dimensions and/or tolerances, or other characteristics are to be understood as modified by the word "about" or "approximately" in describing the scope of the present disclosure. This modification is desired for various reasons including industrial practice, material, manufacturing, and assembly tolerances, and testing capability.

As used herein, the phrase at least one of A, B, and C should be construed to mean a logical (A OR B OR C), using a non-exclusive logical OR, and should not be construed to mean "at least one of A, at least one of B, and at least one of C."

The apparatuses and methods described in this application may be partially or fully implemented by a special purpose computer created by configuring a general-purpose computer to execute one or more particular functions embodied in computer programs. The functional blocks, flowchart components, and other elements described above serve as software specifications, which can be translated into the computer programs by the routine work of a skilled technician or programmer.

The description of the disclosure is merely exemplary in nature and, thus, variations that do not depart from the substance of the disclosure are intended to be within the scope of the disclosure. Such variations are not to be regarded as a departure from the spirit and scope of the disclosure.

What is claimed is:

1. A method of producing an electrode slurry for use in battery manufacturing, the method comprising:
- mixing a plurality of slurry components within an internal volume of a mixing container;
- transmitting acoustic signals across the internal volume of the mixing container;
- monitoring an acoustic attenuation of the acoustic signals over a period of time;
- determining when an end-of-mixing condition is met when the acoustic attenuation reaches a predetermined value; and
- stopping the mixing when the end-of-mixing condition is met.

2. The method of claim 1, wherein the predetermined value is a target value of the acoustic attenuation.

3. The method of claim 1, wherein the predetermined value is a rate of change of an acoustic attenuation coefficient.

4. The method of claim 1, wherein the plurality of slurry components comprise carbon and a polyvinylidene fluoride (PVDF) binder.

5. The method of claim 1, wherein the acoustic signals are transmitted by a plurality of transducers located at a plurality of heights on the mixing container.

6. The method of claim 1, wherein a plurality of acoustic signals are transmitted by an array of transducers.

7. A method of producing an electrode slurry for use in battery manufacturing, the method comprising:
- mixing a plurality of slurry components within an internal volume of a mixing container;
- transmitting ultrasonic signals across the internal volume of the mixing container;
- monitoring an attenuation of the ultrasonic signals over a period of time;

determining when an end-of-mixing condition is met when the acoustic attenuation reaches a predetermined value; and stopping the mixing when the end-of-mixing condition is met.

8. The method of claim 7, wherein the predetermined value is a target value of the attenuation of the ultrasonic signals.

9. The method of claim 7, wherein the predetermined value is a rate of change of the attenuation of the ultrasonic signals.

10. The method of claim 7, wherein the ultrasonic signals are transmitted and received by an array of ultrasonic transducers.

11. A method of producing an electrode slurry for use in battery manufacturing, the method comprising:

mixing a plurality of slurry components within an internal volume of a mixing container;

transmitting acoustic signals across the internal volume of the mixing container;

monitoring an attenuation for the acoustic signals over a period of time; and adjusting at least one mixing parameter based on the attenuation the acoustic signals.

12. The method of claim 11, wherein the acoustic signals are transmitted and received by a plurality of acoustic transducers.

13. The method of claim 12, wherein the acoustic transducers are located on an outside of the mixing container.

14. The method of claim 12, wherein the acoustic transducers are located on an inside of the mixing container.

15. The method of claim 12, wherein the acoustic transducers are located at a plurality of heights on the mixing container.

16. The method of claim 12, wherein the acoustic signals are transmitted and received by an array of acoustic transducers.

17. The method of claim 11, wherein the mixing parameter is adjusted based on a rate of change of the attenuation of at least one of the plurality of acoustic signals.

18. The method of claim 11, wherein the mixing parameter is selected from a group consisting of: a mixing speed, a mixing start, and a mixing stop.

19. The method of claim 11, wherein the mixing parameter is selected from a group consisting of a location of a mixing blade within the internal volume and an angle of the mixing blade.

20. The method of claim 11, wherein the mixing parameter is a mixing profile.

* * * * *